United States Patent [19]

Ooto

[11] Patent Number: 4,802,239

[45] Date of Patent: Jan. 31, 1989

[54] SWITCH DISTRIBUTING APPARATUS FOR COMMUNITY RECEPTION

[75] Inventor: Hideki Ooto, Fukaya, Japan

[73] Assignee: Kabushiki Kaisha Toshiba, Kanasakaki, Japan

[21] Appl. No.: 883,714

[22] Filed: Jul. 9, 1986

[30] Foreign Application Priority Data

Jul. 18, 1985 [JP] Japan .................................. 60-159130

[51] Int. Cl.$^4$ .......................... H04B 1/06; H04H 1/00; H04N 5/268
[52] U.S. Cl. .................................... 455/277; 333/103; 358/86
[58] Field of Search ................. 358/86; 455/3, 4, 277; 307/146; 333/103, 104, 105

[56] References Cited

U.S. PATENT DOCUMENTS

| | | | |
|---|---|---|---|
| 4,509,198 | 4/1985 | Nagatomi | 455/4 |
| 4,527,136 | 7/1985 | Kamiya | 333/103 |
| 4,542,300 | 9/1985 | Nagtomi | 455/3 X |
| 4,669,096 | 5/1987 | Heimbuch | 455/277 X |
| 4,672,687 | 6/1987 | Horton et al. | 455/277 |

*Primary Examiner*—Keith E. George
*Attorney, Agent, or Firm*—Finnegan, Henderson, Farabow, Garrett & Dunner

[57] ABSTRACT

A switching distribution apparatus including first and second distributing sections for distributing first and second reception signals to first and second plurality of lines and a plurality of switch sections for selectively delivering any of said first and second reception signals of the first and second distributing sections to a plurality of outputs in accordance with the control signals from an indoor unit.

4 Claims, 3 Drawing Sheets

4,802,239

SWITCH DISTRIBUTING APPARATUS FOR COMMUNITY RECEPTION

BACKGROUND OF THE INVENTION

This invention relates to a switch distributing apparatus for community reception and, more particularly, to a switch distributing apparatus used for a television reception system which commonly receives a television signal transmitted via a satellite broadcast.

The conventional apparatus of this type can selectively supply a first signal output by a horizontally polarized wave converter and a second signal output by a vertically polarized wave converter to the indoor units through two distributor and four switch circuits.

The apparatus has a drawback. When any indoor unit is not connected to the apparatus or is not in use, the input impedances of the distributors will inevitably vary. If this occurs, the other indoor units being used fail to correctly receive signals.

SUMMARY OF THE INVENTION

It is, therefore, an object of the present invention to provide a new and improved switch distributing apparatus for community reception which can stabilize an input impedance so as not to adversely influence the reception quality of other users even if the unused input is in an open state.

According to the present invention, there is provided a switch distributing apparatus for community reception which includes first distributing means for distributing a first reception signal to a first plurality of lines, second distributing means for distributing a second reception signal to a second plurality of lines; and a plurality of switch means having output terminals and first and second input nodes, wherein each of the switch means is connected to a respective one of the first plurality of lines or the second plurality of lines, for receiving the first and second reception signals from the first and second distributing means, and first and second terminating circuits, and first and second control terminals associated with each of the switching means for selectively receiving a first control signal or a second control signal from indoor unit, and wherein one of the switching means operates to deliver the first reception signal or the second reception signal to its corresponding output terminal in accordance with the first control signal or the second control signal, and wherein through at least one of the output terminals of the plurality of switching means a predetermined dc voltage is commonly supplied at all times from the indoor unit to the other switching means so that each of the switching means terminates, through its respective first and second terminating circuits, the first and second input nodes of the switch means when the first and second control terminals of the switch means are in an open state.

BRIEF DESCRIPTION OF THE DRAWINGS

These and other objects and features of the present invention can be understood through the following embodiment by reference to the accompanying drawings, in which.

DETAILED DESCRIPTION OF THE PREFERRED EMBODIMENTS

Before explaining the present invention, the problems inherent in the conventional switch distributing apparatus will be described in greater detail.

A 4 GHz band television satellite broadcast using a communication satellite provides 24 satellite channels. The following Table indicates satellite channels, their frequencies and polarized waves used in the North American district. In the Table, the polarized waves of the adjacent channels are alternatively polarized at vertically (V) and horizontally (H) polarized wave planes so as to reduce the cross talk between the channels.

TABLE

| Frequency | Channel | Polarized wave planes (MHz) V: Vertical H: Horizontal |
|---|---|---|
| 3720 | 1 | V |
| 3740 | 2 | H |
| 3760 | 3 | V |
| 3780 | 4 | H |
| 3800 | 5 | V |
| 3820 | 6 | H |
| 3840 | 7 | V |
| 3860 | 8 | H |
| 3880 | 9 | V |
| 3900 | 10 | H |
| 3920 | 11 | V |
| 3940 | 12 | H |
| 3960 | 13 | V |
| 3980 | 14 | H |
| 4000 | 15 | V |
| 4020 | 16 | H |
| 4040 | 17 | V |
| 4060 | 18 | H |
| 4080 | 19 | V |
| 4100 | 20 | H |
| 4120 | 21 | V |
| 4140 | 22 | H |
| 4160 | 23 | V |
| 4180 | 24 | H |

Figure 1:
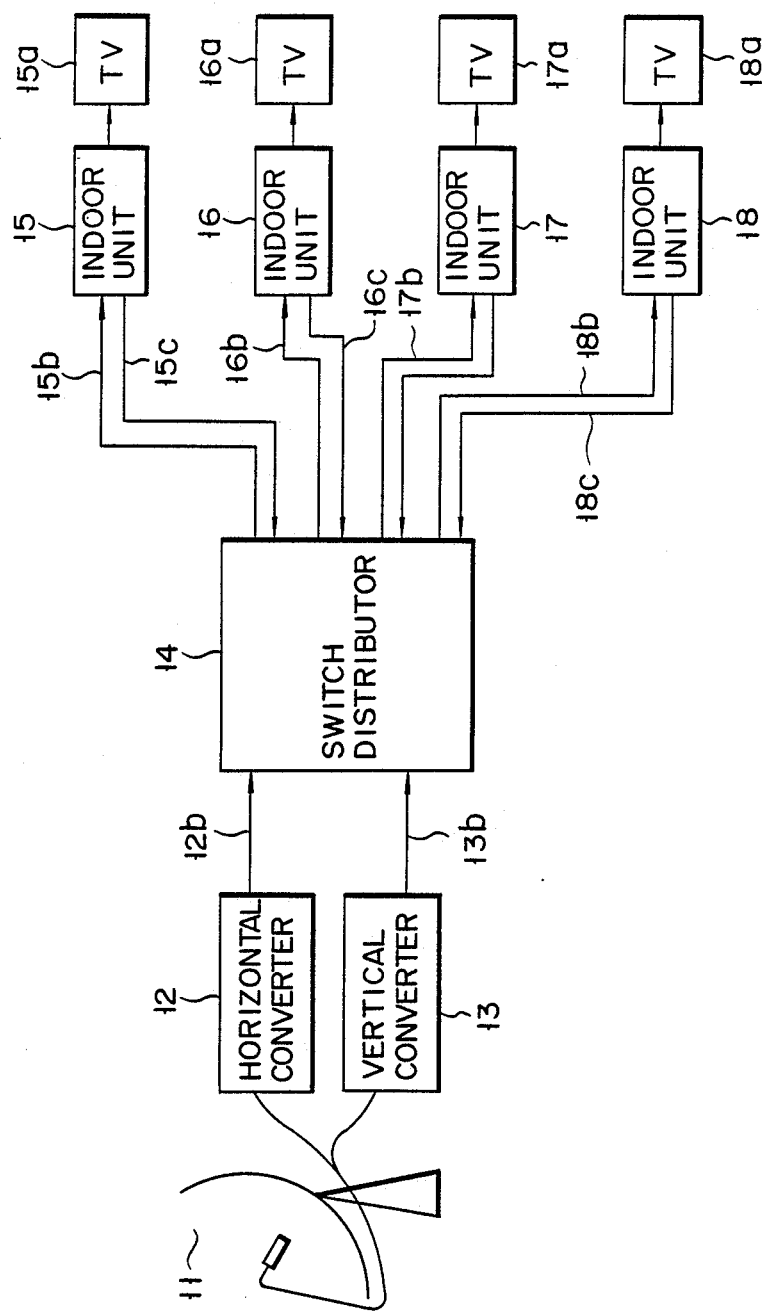
FIG. 1 is a block diagram of a satellite broadcasting receiving system shown to explain a conventional switch distributing apparatus for community reception.

A conventional community reception system for watching the satellite broadcast is made as shown in FIG. 1. The horizontally polarized wave component of radio wave reflected on antenna 11 having 2.8 to 4 m in diameter is supplied to horizontal polarization low noise blockdown converter (hereinafter referred to as "horizontally polarized wave converter") 12, and the vertically polarized wave component is similarly supplied to low noise blockdown converter (hereinafter referred to as "vertically polarized wave converter") 13. Converters 12, 13 contain 5.15 GHz local oscillators to thereby convert 3.7 to 4.2 GHz reception signals into 950 to 1450 MHz intermediate frequency signals, which are then supplied to switch distributor 14. Accordingly, the signals of even channels (2, 4, 6, . . . , 24) in the above Table are contained in the first intermediate frequency signal output from converter 12, and the signals of odd channels (1, 3, 5, . . . , 23) in the above Table are contained in the first intermediate frequency signal output from converter 13.

Switch distributor 14 can supply, for example, distribution outputs into four indoor units 15, 16, 17 and 18. In this case, distributor 14 can supply outputs (even channels: 2, 4, 6, . . . , 24) of converter 12 or outputs (odd channel: 1, 3, 5, . . . , 23) of converter 13 in response to requests of individual indoor units. Units 15 to 18 select a channel from the input signal, and television receivers 15a to 18a respectively receive programs of desired channels.

Further, since converters 12 and 13 as outdoor units require power, units 15 to 18 supply power by utilizing signal cables 15b to 18b and 12b, 13b.

Cables 15c to 18c, connected between units 15 to 18 and distributor 14, respectively, apply selection signals from the indoor units 15 to 18 to the switch distributor 14 so as to select a signal of horizontal polarization and a signal of vertical polarization.

Figure 2:
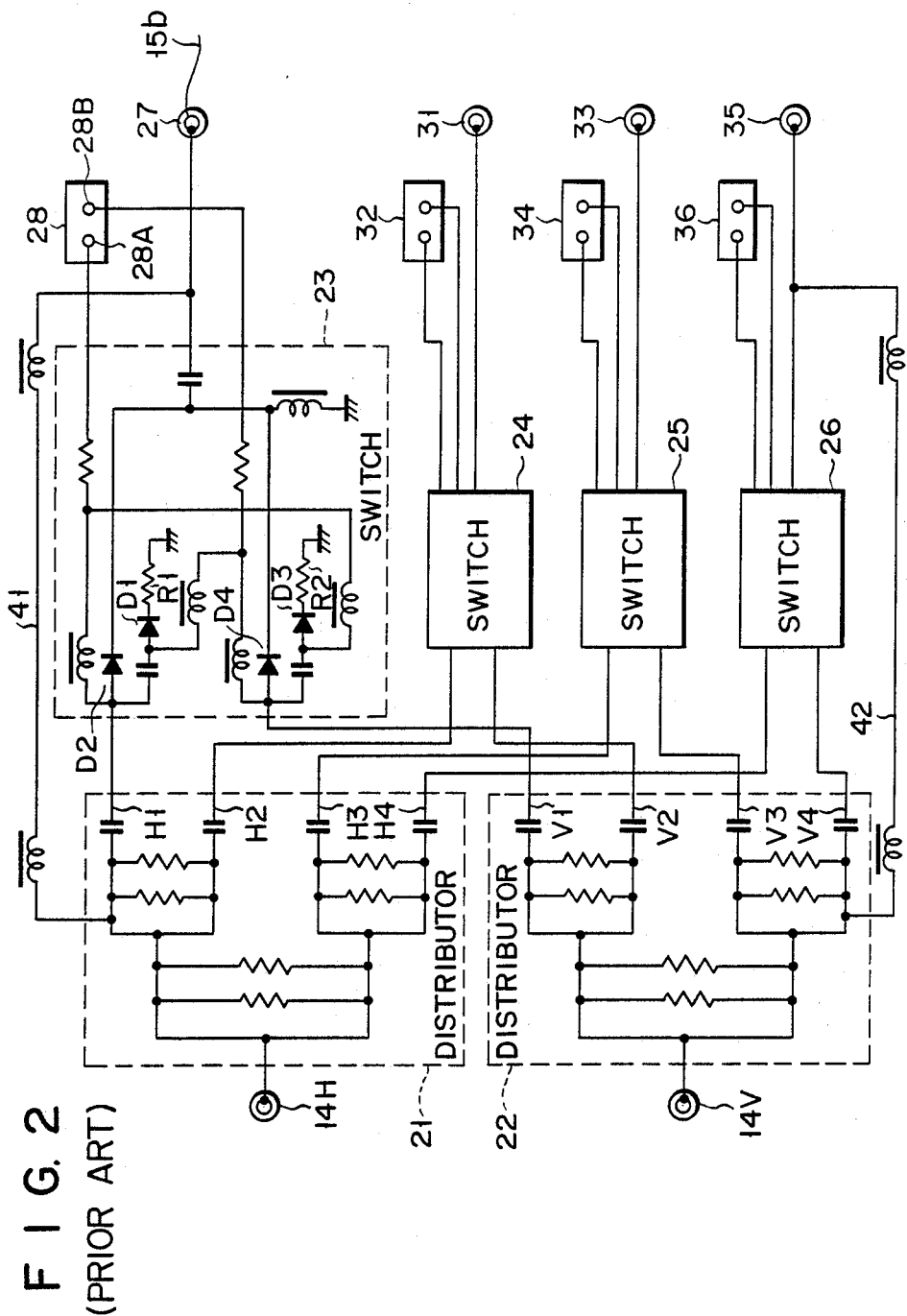
FIG. 2 is a circuit diagram showing an example of a conventional switch distributing apparatus for community reception used in FIG. 1.

FIG. 2 is a circuit diagram showing switch distributor 14 in more detail.

The output from converter 12 is supplied to input terminal 14H, and the output from converter 13 is supplied to input terminal 14V.

Terminals 14H, 14V respectively are input terminals to Wilkinson type distributors 21, 22, which respectively have, for example, four distribution output terminals H1 to H4, V1 to V4. Terminals H1 to H4, V1 to V4 form pairs for horizontal and vertical polarized wave signals, and the pairs of output terminals are respectively connected to switches 23, 24, 25, and 26. Since switches 23 to 26 form similar circuit configurations, only switch 23 will be described.

Distribution output terminals H1, V1 are connected to switch 23. Switch 23 selects one of the horizontally or vertically polarized signals to connect to output terminal 27. A selection signal is determined by the state of a control signal supplied to control terminal unit 28. The output of output terminal 27 is, for example, supplied through cable 15b to indoor unit 15, and a selection signal for switching between horizontal and vertical is supplied from unit 15 to control terminal unit 28.

Assume now that one terminal 28A of terminal unit 28 is high level (+12 V) and other terminal 28B is low level (−12 V), pin diodes D2, D3 become ON, while pin diodes D1, D4 become OFF. Accordingly, in this case, a channel signal transmitted in a horizontal polarization is output to output terminal 27. On the contrary, assume that terminal 28A is low level (−12 V) and terminal 28B is high level (+12 V), diodes D2, D3 become OFF, while diodes D1, D4 become ON. In this case, a channel signal transmitted in a vertical polarization is led to output terminal 27.

As described above, the signals represented by vertical and horizontal polarizations are switched by the control signal applied to terminal 28 via diodes D1 to D4. The circuit connections of diodes D1, D3 will be next discussed. When diodes D1, D3 become ON, they are respectively terminated by matching resistors R1, R2.

As described above, in switch 23, the nonselected signal of the signals appearing on terminals 14H, 14V is terminated through diode D1 or D3, and matched by resistor R1 or R2. This operation is also similar in switches 24 to 26, and the received signal of desired polarization is obtained at distribution output terminals 31, 33 and 35.

A main outdoor unit is connected to distribution output terminals 27, 35 to supply power to converters 12 and 13. Lines 41, 42 are for supplying power.

The input impedance is stabilized by resistors R1, R2 as described above on the conditions that terminals 27, 31, 33, 35 are all used and switches 23 to 26 are driven through terminals 32, 34 and 36.

However, when terminal 31 is not, for example, used in an open state, no control voltage is applied to the diode of switch 24 and it becomes unstable. Accordingly, it disorders the input impedance of the sides of terminal 14H, 14V. Thus, it creates an adverse influence on the reception quality of other indoor units.

More particularly, the mismatched state of the input impedance of the distributor 21 and 22 by unused distribution output terminal 31 introduces an undesired phase disorder, which causes an adverse effect on the differential phase (Dp) and differential gain ($D_G$) characteristic of the reception signal and eventually causes the display screen of the television receiver to displace in colors. This trend becomes remarkable when the number of distributions increases.

Further, since the switch distributing apparatus in FIG. 2 does not operate completely unless positive and negative power sources of high and low levels (+12 V) and (−12 V) are available as control signals for selecting the horizontal and vertical polarization waves, the apparatus of FIG. 2 is disadvantageous in construction. In other words, diodes D1, D4 (when a horizontal polarization wave is selected) or D2, D3 (when a vertical polarization wave is selected) to do not become completely cut off when 0 V is applied as a low level instead of −12 V.

The preferred embodiment of the present invention will be described with reference to the accompanying drawings.

Figure 3:
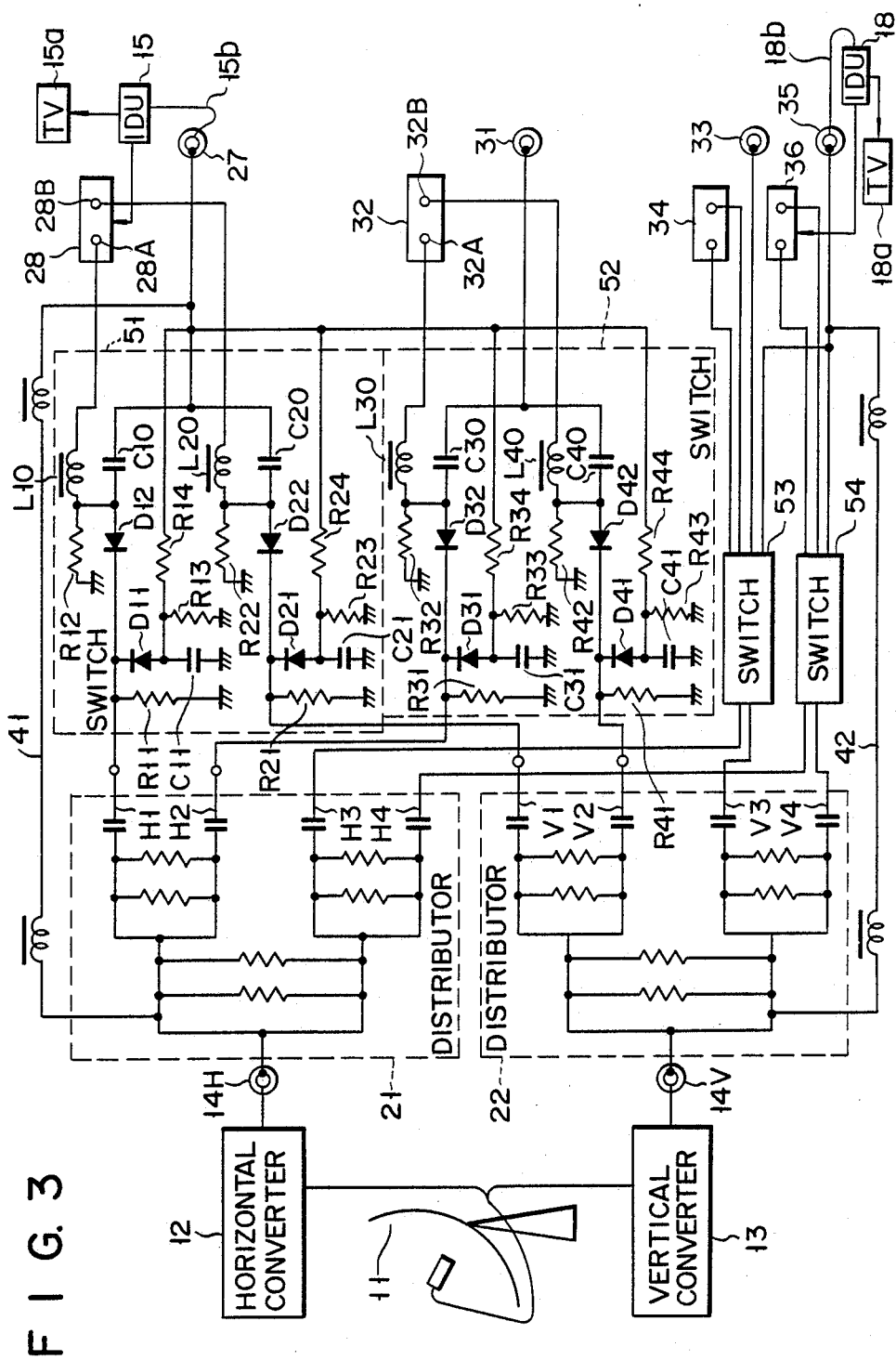
FIG. 3 is a circuit diagram showing an application of an embodiment of a switch distributing apparatus for community reception according to the present invention to a satellite broadcasting receiving system.

FIG. 3 shows an embodiment of the present invention, wherein the same reference numerals are attached to the same parts of the conventional circuit as those described with respect to FIGS. 1 and 2. The sections of this embodiment different from the conventional circuit are switches 51, 52, 53, and 54 connected to the outputs of distributors 21, 22 for distributing the received signals of horizontal and vertical polarization input from antenna 11 through horizontal converter 12 and vertical converter 13. Switches 51, 52, 53, and 54 have similar circuit configuration, so only switches 51, 52 will be described.

Referring to switch 51, the outputs of horizontally and vertically polarized wave converters 12 and 13 are distributed to distribution output terminals H1 to H4 and V1 to V4 of the Wilkinson type distributors 21, 22.

Terminal H1 is grounded through a bias resistor R11 and connected to the cathodes of pin diodes D11, D12. The anode of diode D12 is connected through a DC cut capacitor C10 to distribution output terminal 27. The anode of diode D12 is also grounded through resistor R12 for preventing surges and is connected through coil L10 to one terminal 28A of control terminal unit 28. Diode D12 is ON when terminal 28A is at a high level. The anode of diode D11 is grounded through a matching capacitor C11 and connected to the connection point of voltage converting (dividing) resistors R13, R14 connected between terminal 27 and the ground.

Power (e.g., 18 V D.C.) is supplied from the indoor unit to converter 12 at terminal 27 through the core wires of cable 15b, divided by voltage dividing resistors R13, R14, and approximately 5 V is applied to the anode of diode D11. Therefore, when control terminal 28A is at a high level (12 V), diode D12 is ON, and diode D11 is OFF, while when if terminal 28A is at a low level (−12 V), diode D12 is OFF, and diode D11 is ON.

On the other hand, a similar circuit to the above is connected between terminal V1 led with the output of converter 13 and terminal 27. In other words, diodes D21, D22 corresponding to diodes D11, D12, resistors R21, R22, R23, R24 corresponding to resistors R11, R12, R13, R14, capacitors C20, C21 corresponding to capacitors C10, C11, and coil L20 corresponding to coil L10 are respectively connected. The voltage of the terminal 27 is utilized for the voltage dividing voltage supplied to the anode of diode D21. The anode of diode D22 is connected through coil L20 to terminal 28B.

Therefore, in switch 51 when terminals 28A, 28B of control terminal unit 28 are respectively +12 V and −12 V, the output of the converter 12 is led to terminal 27, while when terminals 28A, 28B are −12 V and +12 V, the output of converter 13 is led to terminal 27.

Next, the switch 52 of distribution output terminal 31 side will be described. This switch 52 has similar circuit configuration to that of switch 51. In other words, diodes D31, D32, D41, D42 correspond to diodes D11, D12, D21, D22 of switch 51, resistors R31 to R34, R41 to R44 correspond to the above resistors R11 to R14, R21 to R24, capacitors C30, C31, C40, C41 correspond to the above capacitors C10, C11, C20, C21, and coils L30, L40 correspond to the above coils L10, L20.

Terminal 31 of switch 52 is connected through capacitor C30, C40 to the anodes of diodes D32, D42 to provide an output of one of converters 12 or 13 in response to the control state of terminal 32.

In addition, the voltage applied to the anode sides of diodes D31, D41 of switch 52 is generated from the power source voltage supplied to terminal 27. In switch 52, signal selection similar to switch 51 is obtained in response to the control voltage applied to terminals 32A, 32B.

Switches 53, 54 respectively have circuit configurations similar to the above switches. Terminal 35 of switch 54 is used as the power supply path of the converter 13 through line 42 together with providing the signal transmission to indoor unit (IDU) 18 through cable 18b. In this case, the voltage supplied to the diodes (corresponding to diodes D11, D21, D31, D41 of switches 51, 52) in switches 53, 54 also utilize the voltage supplied to terminal 35.

According to the switch distributing apparatus of the present invention, as described above, even if an indoor unit (not shown) is not connected to both or either one of terminals 31, 33 and they become open state, the following operation is provided, using switch 52 as an example. At this time, terminals 32A, 32B are opened, and terminal 31 is opened, but voltage corresponding to the outdoor unit is divided to the anodes of diodes D31, D41 and supplied at approximately 5 V. As a result, diodes D31, D41 of switch 52 are ON, and terminals 14H, 14 V are thus terminated even if terminal 31 or 33 is not used, thereby stabilizing the input impedance.

Thus, it can prevent television receivers 15a, 18a from displacing in colors. Thus, even if the control signal is substantially low level or 0 V, a nonselected diode can be completely turned ON, and one of the positive and negative power sources may be prepared to be advantageously used in the configuration.

When the negative power source is held at low level and, thus, 0 V is used as high level, however, each pin diode used in the embodiment described above must be connected in the reverse.

The present invention is not limited to the particular embodiment described above. For example, the voltage supplied to the anodes of diodes D31, D41 is not limited to the type supplied from distribution output terminal 27 but may be supplied from the microstrip line side of a Wilkinson type distributor 21.

In the embodiment described above, the situation where the power from the outdoor unit is supplied through the cable used for transmitting signals has been described. However, if there is a cable used exclusively for a power source, the voltage may be supplied from this cable to the switch.

Further, in the above-mentioned circuit, power is supplied from the indoor unit 15 through terminal 27 to converter 12 and power is supplied from indoor unit 18 through distribution output terminal 35 to converter 13. However, terminals 27, 31, 33, 35 may be all constructed to supply power commonly to converters 12 and 13. Thus, even if terminals 27, 28A, 28B are opened, the voltages are supplied, for example, to the anodes of diodes D11, D21 from terminal 31 to obtain the same effect as described above.

According to the invention as described above, even if a plurality of output and control terminals are unused or in the open state, a switch distributing apparatus for community reception is provided which is not effected by variations of its input impedance.

What is claimed is:

1. A switch distributing apparatus for community reception comprising:
   first distributing means for receiving a first signal and distributing the first signal to a plurality of lines;
   second distributing means for receiving a second signal and distributing the second signal to a plurality of lines; and
   a plurality of switch means, each designed to receive the first signal from the first distributing means, the second signal from the second distributing means, and control signals supplied from outside said switch distributing apparatus, wherein each said switch means outputs said first signal or said second signal in accordance with said control signals, each switch means comprising:
   a first input node connected to one of the lines receiving the first signal;
   a second input node connected to one of the lines receiving the second signal;
   first diode element and second diode element each having a first electrode and a second electrode, the first electrode of the first diode element and the first electrode of the second diode element being connected to the first input node, and being of the same polarity;
   third diode element and fourth diode element each having first electrode and second electrode, the first electrode of the third diode element and the first electrode of the fourth diode element being connected to the second input node, and being of the same polarity;
   first and second DC cut capacitors connected in series between the second electrode of the first diode element and the second electrode of the third diode element;
   first terminating means connected between the second electrode of the second diode element and a reference potential node;

second terminating means connected between the second electrode of the fourth diode element and the reference potential node;

a first bias element connected between the first input node and the reference potential node;

a second bias element connected between the second input node and the reference potential node;

first control terminal and second control terminal coupled to the second electrode of the first diode element and the second electrode of the third diode element, respectively, for activating one of the first diode element and third diode element and deactivating the other of the first diode element and third diode element in response to said control signals;

an output terminal connected to the connection point between the first and second DC cut capacitors, the output terminal of at least one of said switch means being adapted to receive a DC voltage for driving at least one external device;

first voltage converting means connected between said output terminal receiving the DC voltage and the second electrode of the second diode element for converting the DC voltage to a voltage capable of activating the second diode element in response to the inactivated state of said first diode element including the open state of said first control terminal; and second voltage converting means connected between said output terminal receiving the DC voltage and the second electrode of the fourth diode element for converting the DC voltage to a voltage capable of activating the fourth diode element in response to the inactivated state of said third diode element including the open state of said second control terminal.

2. A switch distributing apparatus according to claim 1, wherein said first and second signals are, respectively, first intermediate frequency signals from horizontally and vertically polarized wave converters of a satellite broadcasting receiving system.

3. A switch distributing apparatus according to claim 1, wherein said first and second distributing means distribute the first and second signals to two pairs of first and second lines, respectively, and said switch means comprise first to fourth switch means.

4. A switch distributing apparatus according to claim 3, wherein said DC voltage is externally supplied only to said output terminals of said first and fourth switch means.

* * * * *

UNITED STATES PATENT AND TRADEMARK OFFICE
CERTIFICATE OF CORRECTION

PATENT NO. : 4,802,239

DATED : January 31, 1989

INVENTOR(S) : Hideki Ooto

It is certified that error appears in the above-identified patent and that said Letters Patent is hereby corrected as shown below:

On the title page:

In the assignee's address change "Kanasakaki, Japan" to --Kawasaki, Japan--.

Signed and Sealed this

Eighth Day of May, 1990

Attest:

HARRY F. MANBECK, JR.

*Attesting Officer*  *Commissioner of Patents and Trademarks*